United States Patent Office 3,266,850
Patented August 16, 1966

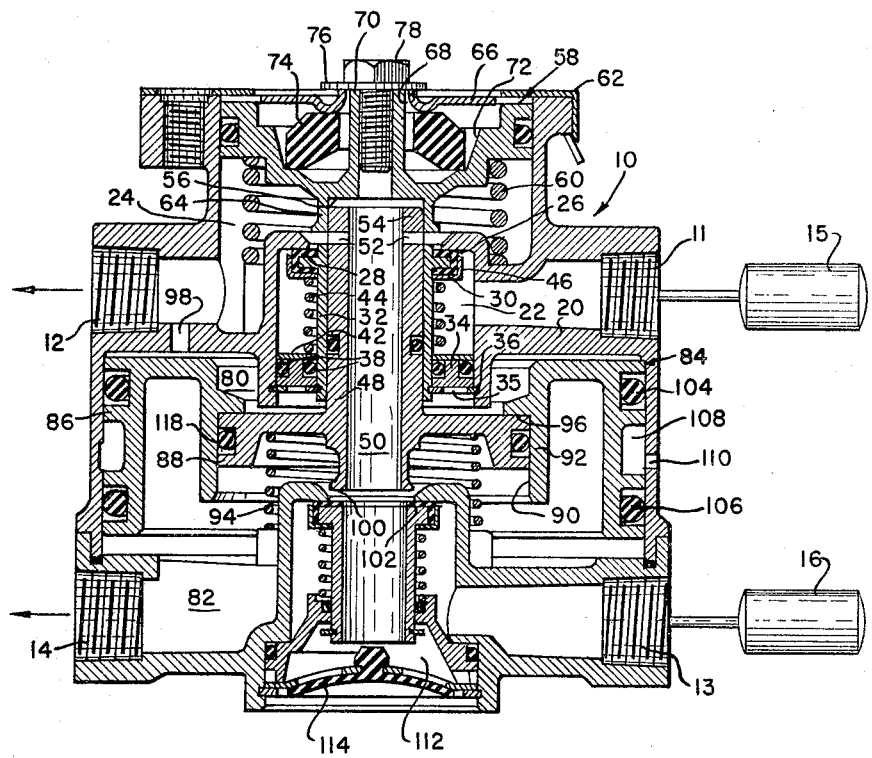

3,266,850
BRAKE VALVE OR THE LIKE FOR TWO
SEPARATE SYSTEMS
Guenter K. Herold, Elyria, Ohio, assignor to Bendix-Westinghouse Automotive Air Brake Company, Elyria, Ohio, a corporation of Delaware
Filed Mar. 13, 1964, Ser. No. 351,642
12 Claims. (Cl. 303—52)

This invention relates to brake valves for controlling the application of fluid pressure operated brakes for vehicles and more particularly to a brake valve for controlling simultaneously two separate braking systems, one of which may be auxiliary to a primary system and can be controlled by the valve independently of the primary system in the event the latter should fail.

The application of Harry M. Valentine, Serial No. 266,956, filed March 21, 1963, now abandoned, and assigned to the same assignee as the present invention discloses a dual circuit brake valve comprising a pair of tandemly arranged, self-lapping valve elements, the first of which is controlled manually by foot pressure and the second of which functions as a relay valve in response to braking pressure by the first valve to the actuators controlled by it. Because it is desirable that uniform pressure be delivered to the respective actuators served by each valve part, the relay piston is made substantially larger than the graduating piston of the manually operated valve in order that the relay will have sufficient sensitivity to deliver pressure which is substantially equal to the pressure delivered by the manually operated valve part; that is to say, the second piston must be of sufficient size that despite additional friction and spring resistance, it responds to and follows accurately even very low relay pressures.

In the event braking pressure is lost from the circuit controlled by the manually operated valve so that relay pressure is not available for the second valve, then and in that event the operator depresses his foot a distance greater than normal and this mechanically opens the second valve which thereafter functions as a normal self-lapping valve. Those skilled in the art will recognize that after the second valve has been opened, braking pressure tending to move the relay piston in a lapping direction against the operator's foot operates across the entire diameter of the enlarged lapping piston so that considerable force is required by the operator to move the piston against this pressure force in the event additional braking pressure is required in the actuators.

One of the prime objects of the present invention is to overcome the foregoing problem by constructing the relay piston of two cooperating, co-axial parts rather than of a single part as in the co-pending application. With this arrangement, when the combined pistons are subjected to relay pressure, they function as a single piston exactly as in the prior application but when the valve is to be opened solely by manual control, only the central smaller piston part is subjected to lapping pressure thereby avoiding increased foot force to control the valve.

Another object of the invention is to provide a dual system brake valve so constructed that in the event of failure of either system the brake pedal effort remains substantially unchanged and the loss of control of one system is not reflected in the other.

Though the dual piston construction is shown and described in conjunction with a dual pressure brake valve, it will be aparent to those skilled in the art that the invention is not limited to this use inasmuch as it is applicable in a large number of situations where a member which is normally controlled by pressure must be operated manually against a pressure force in the event of the loss of control pressure.

The invention will now be described in detail in conjunction with a single figure which is a vertical cross sectional view of a valve embodying the features of the invention.

In the drawing the numeral 10 designates a valve casing having primary and secondary pairs of inlet and delivery ports 11, 12 and 13, 14. The respective inlet ports 11, 13 are connected to independent fluid pressure supply sources 15, 16 and the delivery ports 12, 14 are adapted to be connected to independent brake actuators. The interior of the casing 10 is divided by a wall 20 into upper and lower parts each containing valve elements for controlling the flow of fluid between the respective inlet and delivery ports or between the delivery ports and atmosphere.

With particular reference to the part of the casing above the wall 20, it will be observed that this is divided into an inlet cavity 22 and a delivery cavity 24 which are separated by a valve seat 26 normally closed by an annular, combined inlet and exhaust valve element 28 received on a radial flange 30 at the upper end of a sleeve 32 slideably received in the central aperture of an annular sealing ring 34 received in a central opening 35 through the wall 20 and which may be of inverted T-shape in cross section and is supported at its bottom edge by a snap ring 36. The stem of the T-shape sealing ring 34 is bracketed by a pair of O-rings 38 and the upper surface of the stem affords a support for a washer 42 which serves as an abutment for the lower end of a spring 44 whose upper end is in engagement with a metallic valve support member 46 to urge the valve 28 to its closed position in sealing engagement with the valve seat 26.

The valve sleeve 32 slideably receives an exhaust plunger 48 having a vertical exhaust passage 50 therein whose uper end is normally connected to the deliverey cavity 24 through a series of lateral openings 52 formed in the head 54 of the plunger 48. The head 54 of the plunger is slideably received in a recess 56 on the underside of a graduating piston 58 slideably received in the delivery cavity 24 and normally urged to the position of the drawing by a spring 60 interposed between the floor of cavity 24 and the lower surface of the piston. A stop plate 62 limits the upward movement of the piston.

A clearance exists between the top of the recess 56 and the upper edge of the head 54 of the exhaust plunger and surrounding the recess is a skirt 64 forming an exhaust valve seat, which upon downward movement of the piston is adapted to sealingly engage the inner annular part of the inlet valve element 28 thus disconnecting the delivery cavity 24 from the exhaust passage 50 in the plunger 48. Continued downward movement of the piston unseats valve element 28 thereby connecting the inlet cavity 22 to the delivery cavity 24 so that fluid flows to the brake actuators by way of delivery port 12.

Movement of the piston 58 to effect closing of the exhaust passage and opening of the inlet valve is effected by a conventional brake pedal (not shown) which has a part bearing on an enlarged disc 66 having a central aperture 68 freely received on an upstanding neck part 70 of the piston 58. Received in a recess 72 on the upper side of the piston is a rubber graduating spring 74 of a somewhat frusto-conical configuration which bears against the lower surface of the recess 72 and also against the underside of the disc 66 to urge this upwardly into engagement with a washer 76 fixed to the neck part 70 by a machine screw 78. For a complete description of a suitable pedal arrangement and the structure, mode of operation and advantages of the rubber graduating spring 74 reference is made to the patent to Herbert A. Kemble, No. 3,003,825, dated October 10, 1961, it being sufficient to say here that when the brake pedal is depressed the disc 66 tends to compress spring 74 which in turn moves the piston 58 downwardly against the spring 60 until the exhaust valve seat 64 is closed and the inlet valve 28 is opened whereupon the pressure admitted to cavity 24 acts on the lower side of the piston and this pressure force coupled with the force of spring 60 causes the piston to move upwardly to further compress spring 74 until the inlet and exhaust valve parts are lapped as previously described. Downward or upward movement of the pedal increases or relieves the pressure in the cavity in a manner well recognized by those skilled in the art and further description of this action is not deemed necessary.

Referring now to the part of the valve casing below the dividing wall 20, the numeral 80 designates a relay cavity which is separated from a second delivery cavity 82 by relay piston means 84 constructed in accordance with the invention. As can be observed, the piston means 84 is composed of an outer piston part 86 and an inner piston part 88 which is slideably received in an annular cavity 90 formed by a central skirt 92 integral with the outer piston part 86. The inner piston part is normally urged by a spring 94 into tight engagement with an annular shoulder 96 at the upper end of the annular cavity 90 so that when relay pressure is admitted to the relay cavity 80 from the upper delivery cavity 24 by way of a relay port 98 in the wall 20, the piston parts 86, 88 move downwardly as a single unit until the lower end 100 of the exhaust plunger 48 engages a lower combined inlet and exhaust valve element 102 to first close off the exhaust passage 50 from the lower delivery cavity 82 and thereafter open the inlet valve to connect the lower inlet and deliver ports 13, 14. As the pressure builds up in the delivery cavity 82 it operates against the lower surface of the pistons 86, 88 to move these members upwardly as a unit until the inlet and exhaust valve ports are lapped and as so far described, the valve of the invention operates substantially identically to the valve disclosed in the application previously referred to.

Now, should pressure for some reason be lost at the upper inlet port 11, when the operator depresses the brake pedal, no pressure is available to operate the actuators connected to the upper delivery port 12 nor is any relay pressure available to operate the combined pistons and move the lower valve to its open position. In this event the operator depresses his foot a greater amount than normal which, in accordance with the invention, now causes only the inner piston part 88 to be moved downwardly independently of the outer piston part 86 until the lower end 100 of the exhaust plunger has engaged the valve element 102 and moved it to its open position whereupon fluid pressure is admitted to the delivery port 14 by way of the delivery cavity 82 where this pressure acts now upwardly against the area defined by the inner piston member 88 to move the latter upwardly to lap position against the foot force acting downwardly on the rubber spring 74. Should the operator now determine that additional braking pressure is required he would again move the pedal downwardly against the opposing force of the pressure already in the delivery cavity 82 but since this pressure is acting only against the relatively small area of the piston part 88, the valve member 102 is moved to open position with only moderate effort.

Desirably, the cross sectional area of the piston part 88 is selected to be substantially equal to the cross-sectional area of the upper piston member 58 so that the force acting against the lower piston part 88 is of normal magnitude fully capable of being overcome by increased foot force almost as if the inner piston part 88 were a graduating piston of a conventional unitary brake valve. Obviously this would not be the case were it necessary for the operator to actuate the lower valve 102 against a force derived from delivery pressure acting against the entire cross sectional area defined by the combined lower surfaces of both piston parts 86, 88.

As can be seen in the drawing, the outer piston part 86 is provided with a pair of vertically spaced O-rings 104, 106 which are separated by an annular channel 108 connected at all times to atmosphere by way of an exhaust port 110 which may, for purposes of protection against dirt be connected to the exhaust cavity 112 above the dust cover 114, as by way of a suitable conduit. The purpose of the two O-rings is to guard against failure of both circuits should one circuit and one O-ring fail. However, if desired, a single O-ring could be employed instead of the two shown and instead of the single O-ring 118 surrounding the inner piston part 88, two O-rings could be employed to function in substantially the same manner as the described O-rings 104, 106 about the large piston part 86.

Though the invention has been described in conjunction with a dual circuit brake valve it will be apparent to those skilled in the art that the use of a two-part piston member normally responsive to opposing pressures acting on opposite faces thereof is not restricted necessarily to brake valves but may be employed wherever a fluid pressure servo mechanism must be operated manually against an opposing pressure upon failure of the servo pressure. It will also be apparent to those skilled in the art that the invention is susceptible of a variety of changes and modifications without however departing from the scope and spirit of the appended claims.

What is claimed is:

1. A relay valve including a valve casing having inlet, delivery and control cavities and ports, a normally closed valve element between the inlet and delivery ports, and fluid pressure responsive means for controlling said valve element in response to opposing pressures in said control and delivery cavities, said means comprising first and second cooperating parts, said first part having a first motive area exposed to the pressure in said control cavity and a second opposing annular motive area exposed to the pressure in said delivery cavity, a cylindrical passage in the center of said first part and open to said delivery cavity, said second part comprising a piston slideably received in said cylindrical passage and having a motive area exposed to the pressure in said delivery cavity, means controlled by said piston and engageable with said valve element for moving the latter to open position when said piston is moved theretowards, stop means in said cylindrical passage for limiting the movement of said piston away from the open end of said passage, resilient means normally urging said piston into engagement with said stop means whereby both of said parts are urged away from said valve element, and manual means operatively connected to said piston for effecting movement of the latter towards said valve element independently of the first part of said pressure responsive means to effect opening of said valve element in the absence of pressure in said control cavity.

2. A dual circuit brake valve comprising first and second sets of inlet and delivery ports, first and second normally closed valve members for controlling communication between the respective inlet and delivery ports, manual valve actuating means for moving the first valve member to open position, second valve actuating means in axial alignment with said manual means and engageable thereby for moving said second valve member to open position, a fluid pressure responsive relay member movable independently of said second valve actuating means but engageable therewith to move the same to valve opening position independently of said manual means, and fluid passage means communicating said first delivery port with said pressure responsive relay member.

3. The valve of claim 2 wherein said first and second graduating pistons have substantially equal motive areas exposed to the pressures at the respective delivery ports.

4. The valve of claim 2 including first and second graduating pistons integrally connected to the respective valve actuating means, each of said pistons being exposed at all times to the pressure at the respective delivery ports, and resilient means at all times urging said graduating pistons and hence said valve actuating means away from the normally closed valve members.

5. A dual circuit brake valve comprising first and second sets of inlet and delivery ports, first and second normally closed valve members for controlling communication between the respective inlet and delivery ports, manual valve actuating means for moving the first valve member to open position, a graduating piston integral with said manual valve actuating means and having a motive area exposed at all times to the pressure at the first delivery port, second valve actuating means in axial alignment with said first valve actuating means and adapted to be engaged by said first valve actuating means after pre-determined movement thereof in a valve opening direction to move said second valve member to open position, a second graduating piston integral with said second valve actuating means and having a motive area exposed at all times to the pressure at the second delivery port, a fluid pressure responsive relay member movable independently of said second valve actuating means but engageable therewith to move the same to valve opening position independently of said manual means, and fluid passage means communicating said first delivery port with said pressure responsive relay member.

6. The valve of claim 5 wherein said relay member includes an integral coaxial cylindrical part and wherein said second graduating piston is slideably received in said cylindrical part, said relay member extending radially beyond said second graduating piston and affording motive areas substantially in excess of the motive area of said graduating piston whereby the latter may be readily moved manually in opposition to the pressure at second delivery port and independently of said relay member.

7. The valve of claim 6 wherein said first and second graduating pistons have substantially equal motive areas exposed to the pressures at the respective delivery ports.

8. The valve of claim 6 including abutment means cooperating with said graduating piston and the cylinder carried by said relay member, and spring means urging said second graduating piston into releasable engagement with said abutment means whereby said relay member and said graduating piston respond as a unit to pressure at said first delivery port, said abutment means being arranged that said graduating piston is freely moved from said abutment means by said manual means in the absence of pressure at said first delivery port.

9. An alternatively manual or fluid pressure relay valve having inlet, delivery and control ports, a normally closed valve element for controlling communication between said inlet and delivery ports, a plunger in axial alignment with said valve element, manually operable means in axial alignment with said plunger, a graduating spring interposed between said manually operable means and said plunger, a graduating piston fixed to said plunger and having a motive area exposed to the pressure at said delivery port, a pressure responsive relay member coaxial with said plunger and said piston and having a first motive area exposed to the pressure at said control port and a second motive area exposed to the pressure at said delivery port, cylinder means carried by said relay member and slideably receiving said graduating piston, spring means operating on said plunger and said graduating piston to urge the latter into tight engagement with said relay member whereby said graduating piston and plunger move in unison with said relay member to control said valve member in response to the greater of opposing pressure forces acting on said relay member and on said graduating piston, said piston being movable independently of said relay member against said spring to open said valve member in the absence of pressure at said control port.

10. A dual circuit fluid pressure control valve having two sets of inlet and delivery ports and cavities, a pair of axially aligned normally closed valve elements for controlling communication between the respective inlet and delivery ports and the cavities, manual means including a graduating spring and piston in axial alignment with said first valve for controlling the same, pressure responsive relay means for controlling the second valve and including a control cavity connected at all times with the first delivery cavity and a relay piston coaxial with said second valve element and separating said control cavity from said second delivery cavity, said relay piston being responsive to the greater of the two opposing forces acting on the opposite sides thereof for movement towards or away from said second valve element, said relay piston comprising first and second cooperating parts, said first part comprising an annular member slideably received in said delivery cavity and having an integral cylindrical part opening freely into said delivery cavity, abutment means adjacent the end of said cylindrical cavity opposite the opening end thereof, the second part of said relay piston comprising a pressure responsive member slideably received within said cylindrical cavity and having a pressure responsive motive area exposed to the open end of said cavity, valve operating means integral with said second part for effecting control of said valve upon movement of said second part, spring means normally urging said second part into engagement with said abutment means whereby said first and second parts of said piston respond to control and delivery pressure as a unitary member, and plunger means extending axially through said relay piston in the direction of said manual means so as to be engageable thereby upon predetermined movement thereof in a valve opening direction to actuate said second part of said relay piston independently of said first part in the absence of control pressure in said control cavity.

11. The control valve of claim 10 wherein the first part of said relay piston includes a pair of spaced sealing members serving to isolate said delivery and control cavities, an annular channel in said second part between said sealing members, and port means connecting said annular channel at all times with atmosphere.

12. The control valve of claim 10 including first and second exhaust ports and normally open exhaust valves for controlling communication between said delivery cavities and atmosphere, and means for closing said exhaust valves prior to the opening of the respective normally closed valves between the inlet and delivery cavities.

References Cited by the Examiner

UNITED STATES PATENTS

| 1,669,280 | 5/1928 | Blair et al. | 251—14 |
| 3,003,825 | 10/1961 | Kemble | 303—54 |
| 3,150,899 | 9/1964 | Berg et al. | 303—40 X |

FOREIGN PATENTS

| 798,816 | 7/1958 | Great Britain. |

BENJAMIN HERSH, *Primary Examiner.*

EUGENE G. BOTZ, *Examiner.*

M. S. SALES, *Assistant Examiner.*

UNITED STATES PATENT OFFICE
CERTIFICATE OF CORRECTION

Patent No. 3,266,850                                      August 16, 1966

Guenter K. Herold

It is certified that error appears in the above identified patent and that said Letters Patent are hereby corrected as shown below:

Column 4, line 69, claim reference numeral "2" should read -- 4 --.

Signed and sealed this 10th day of February 1970.

(SEAL)
Attest:

Edward M. Fletcher, Jr.                      WILLIAM E. SCHUYLER, JR.
Attesting Officer                                  Commissioner of Patents